(12) United States Patent
Biegun (10) Patent No.: US 9,744,938 B2
(45) Date of Patent: Aug. 29, 2017

(54) PASSENGER RESTRAINT HOUSING FOR VEHICLE

(71) Applicant: Jeffery L. Biegun, Jupiter, FL (US)

(72) Inventor: Jeffery L. Biegun, Jupiter, FL (US)

( * ) Notice: Subject to any disclaimer, the term of this patent is extended or adjusted under 35 U.S.C. 154(b) by 123 days.

(21) Appl. No.: 14/751,451

(22) Filed: Jun. 26, 2015

(65) Prior Publication Data

US 2016/0375858 A1    Dec. 29, 2016

(51) Int. Cl.
*B60R 22/34* (2006.01)
*B60R 22/24* (2006.01)

(52) U.S. Cl.
CPC ............ *B60R 22/34* (2013.01); *B60R 22/24* (2013.01); *B60R 2022/3402* (2013.01)

(58) Field of Classification Search
CPC ..... B60R 22/46; B60R 22/4604; B60R 22/34; B60R 2022/3402
USPC .......................... 242/374.379, 379.2; 280/807
See application file for complete search history.

(56) References Cited

U.S. PATENT DOCUMENTS

| | | | |
|---|---|---|---|
| 7,322,600 B2 * | 1/2008 | Inoue ................... | B60R 21/232 280/730.2 |
| 7,828,322 B2 * | 11/2010 | Breuninger ........... | B60R 21/231 280/730.2 |
| 7,988,187 B2 * | 8/2011 | Yamamura ............ | B60R 21/232 280/730.2 |
| 8,651,525 B2 * | 2/2014 | Kaku ..................... | B60R 22/34 280/756 |
| 9,221,419 B2 * | 12/2015 | Ikenohata ............. | B60R 21/237 |
| 2013/0088003 A1 * | 4/2013 | Kaku ..................... | B60R 22/34 280/807 |
| 2014/0028075 A1 * | 1/2014 | Kohlndorfer .......... | B60R 22/48 297/475 |

FOREIGN PATENT DOCUMENTS

| | | | | |
|---|---|---|---|---|
| DE | WO 2004048160 A1 * | 6/2004 | ............ | B60R 22/34 |
| FR | WO 2016097509 A1 * | 6/2016 | ............ | B60R 22/24 |
| JP | 11-189129     * | 7/1999 | ............ | B60R 22/24 |
| JP | WO 2012098784 A1 * | 7/2012 | ......... | B60R 22/4633 |
| JP | WO 2012165410 A1 * | 12/2012 | ........ | B60R 22/4633 |

\* cited by examiner

*Primary Examiner* — Karen Beck
(74) *Attorney, Agent, or Firm* — Simpson & Simpson, PLLC (57) ABSTRACT

A passenger restraint housing for a vehicle including a frame having a top surface and a bottom surface, a retractor secured to the bottom surface of the frame and operatively arranged to hold a seat belt, and at least one mounting bracket, where the mounting bracket is arranged to be secured to the body of the vehicle. The frame further includes a first portion, a first transition, a second portion, a second transition, and a third portion. The first and second portions are secured to one another via the first transition and the second and third portions are secured to one another via the second transition. The first and second portions are disposed at opposite ends of and integral with the first transition and the second and third portions are disposed at opposite ends of and integral with the second transition.

20 Claims, 11 Drawing Sheets

Fig. 18

PASSENGER RESTRAINT HOUSING FOR VEHICLE

FIELD OF THE INVENTION

The invention broadly relates to a passenger restraint housing for a vehicle, and in particular, to a passenger restraint housing having a frame, a retractor, and a seat belt disposed therein, where the housing is mounted to the interior body of the vehicle.

BACKGROUND OF THE INVENTION

Passenger restraints for vehicles are well known, particular in the form of seat belts. A seat belt, also known as a safety belt, is a safety device designed to secure the occupant of a vehicle against harmful movement that may result during a collision or a sudden stop. A seat belt functions to reduce the likelihood of death or serious injury in a traffic collision by reducing the force of secondary impacts with interior strike hazards, by keeping occupants positioned correctly for maximum effectiveness of the airbag, and by preventing occupants being ejected from the vehicle in a crash or if the vehicle rolls over. Additionally, vehicles are subject to state and local governmental codes, requirements, and safety inspections, and may have to pass inspections by insurance companies as well.

In some vehicles, such as the Chevrolet Camaro during the years 1974-1981 and 1982-1992, the seat belt is mounted to the interior body of the vehicle underneath the headliner. However, the original housing that includes the frame, retractor, and seatbelt, no longer meets present safety regulations set forth by the National Highway Traffic and Safety Administration (NHTSA). Thus, there is a long felt need for a passenger restraint housing that complies with current safety standard, while still allowing the seat belt to secure the occupant during a collision.

BRIEF SUMMARY OF THE INVENTION

The present invention broadly includes passenger restraint housing for a vehicle having a frame, a retractor, and at least one mounting bracket. The frame has a top surface and a bottom surface. The retractor is secured to the bottom surface of the frame and operatively arranged to hold a seat belt. The at least one mounting bracket is arranged to be secured to the body of the vehicle.

The frame further includes a first portion, a first transition, a second portion, a second transition, and a third portion. The first and second portions are secured to one another via the first transition and the second and third portions are secured to one another via the second transition. Additionally, the first and second portions are disposed at opposite ends of and integral with the first transition and the second and third portions are disposed at opposite ends of and integral with the second transition. Moreover, the first, second, and third portions are arranged substantially parallel to one another and substantially perpendicular to the first and second transitions.

In a first embodiment, the passenger restraint housing includes two mounting brackets. The first mounting bracket is secured to the first portion and the second mounting bracket is secured to the third portion. The frame includes at least one aperture, but preferably three apertures. The first aperture is disposed within the first portion, the second aperture is disposed within the second portion, and the third aperture is disposed within the third portion. The retractor is secured to the bottom surface of the frame via a fastening means, such as a bolt, screw, etc., disposed within the second aperture. Furthermore, the retractor includes a guide having a slot, where the seatbelt is threaded through the slot of the guide.

In the first embodiment, the frame has a length and a width, and the length is approximately 7 inches and the width is approximately 2¾ inches. However, it should be appreciated that the dimensions may vary and that the passenger restraint housing may be any size suitable in the art. Preferably, the frame is made of metal. However, it should be appreciated that the frame, as well as any of the other elements, such as the retractor, seat belt, etc., can be made of any suitable material known in the art.

In a second embodiment, the passenger restraint housing has one mounting bracket arranged to be secured to the body of the vehicle. The mounting bracket is secured to the first portion and the third portion of the frame. Similar to the first embodiment, the frame includes at least one aperture, but preferably three apertures. The first aperture is disposed within the first portion, the second aperture is disposed within the second portion, and the third aperture is disposed within the third portion. The retractor is secured to the bottom surface of the frame via a fastening means, such as a bolt, screw, etc. disposed within the second aperture. Furthermore, the retractor includes a guide having a slot, where the seatbelt is threaded through the slot of the guide.

In the second embodiment, preferably, the frame is made of metal. However, it should be appreciated that the frame, as well as any of the other elements, such as the retractor, seat belt, etc., can be made of any suitable material known in the art.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. It also should be appreciated that figure proportions and angles are not always to scale in order to clearly portray the attributes of the present invention.

While the present invention is described with respect to what is presently considered to be the preferred aspects, it is to be understood that the invention as claimed is not limited to the disclosed aspects. The present invention is intended to cover various modifications and equivalent arrangements included within the spirit and scope of the appended claims.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
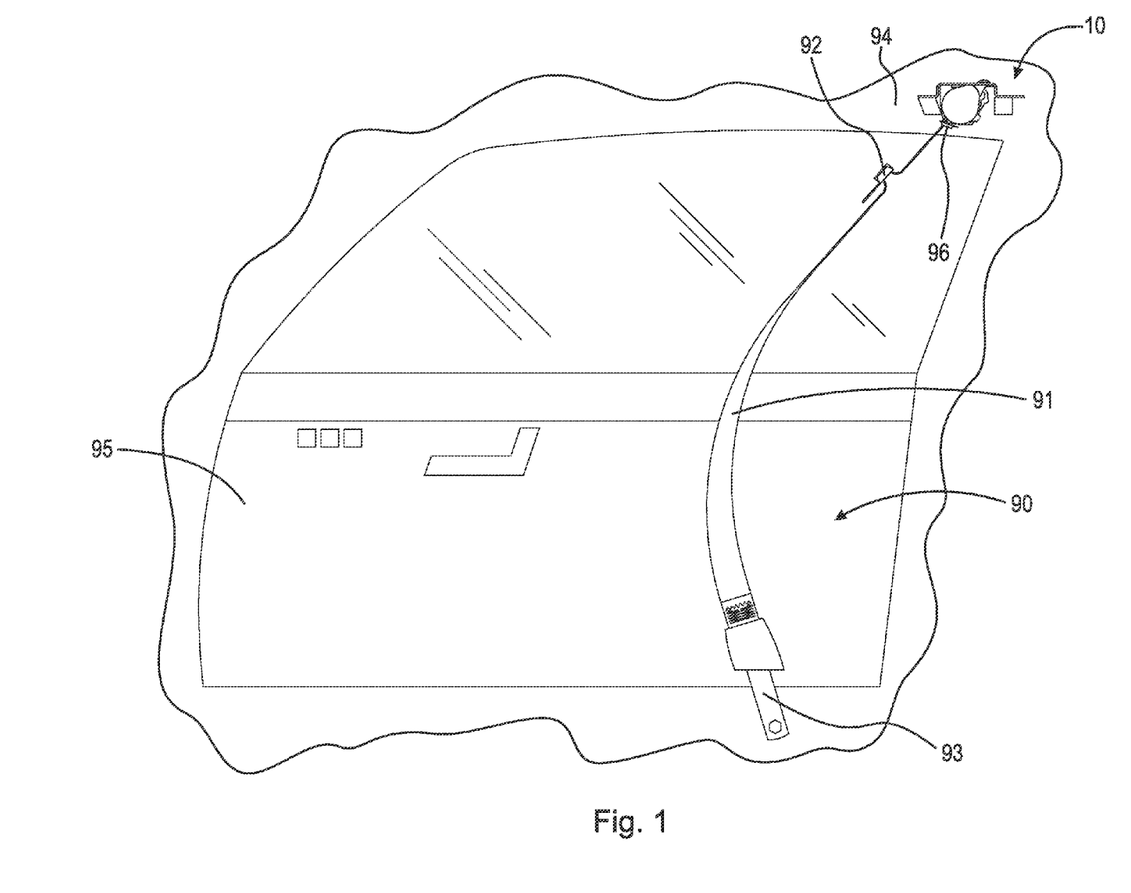
FIG. 1 is a perspective view of a passenger restraint housing for a vehicle, shown having a seatbelt disposed within the housing and secured to the frame of the vehicle.

Adverting now to the figures, FIG. 1 is a perspective view of passenger restraint housing 10 (hereinafter referred to as housing 10) of the present invention for vehicle 90, shown with housing 10 secured to body 94 of vehicle 90. As shown in FIG. 1, seat belt 91, including buckle 92 and vehicle mount 93, extends downwardly from housing 10 through guide 96 across door 95.

Figure 2:
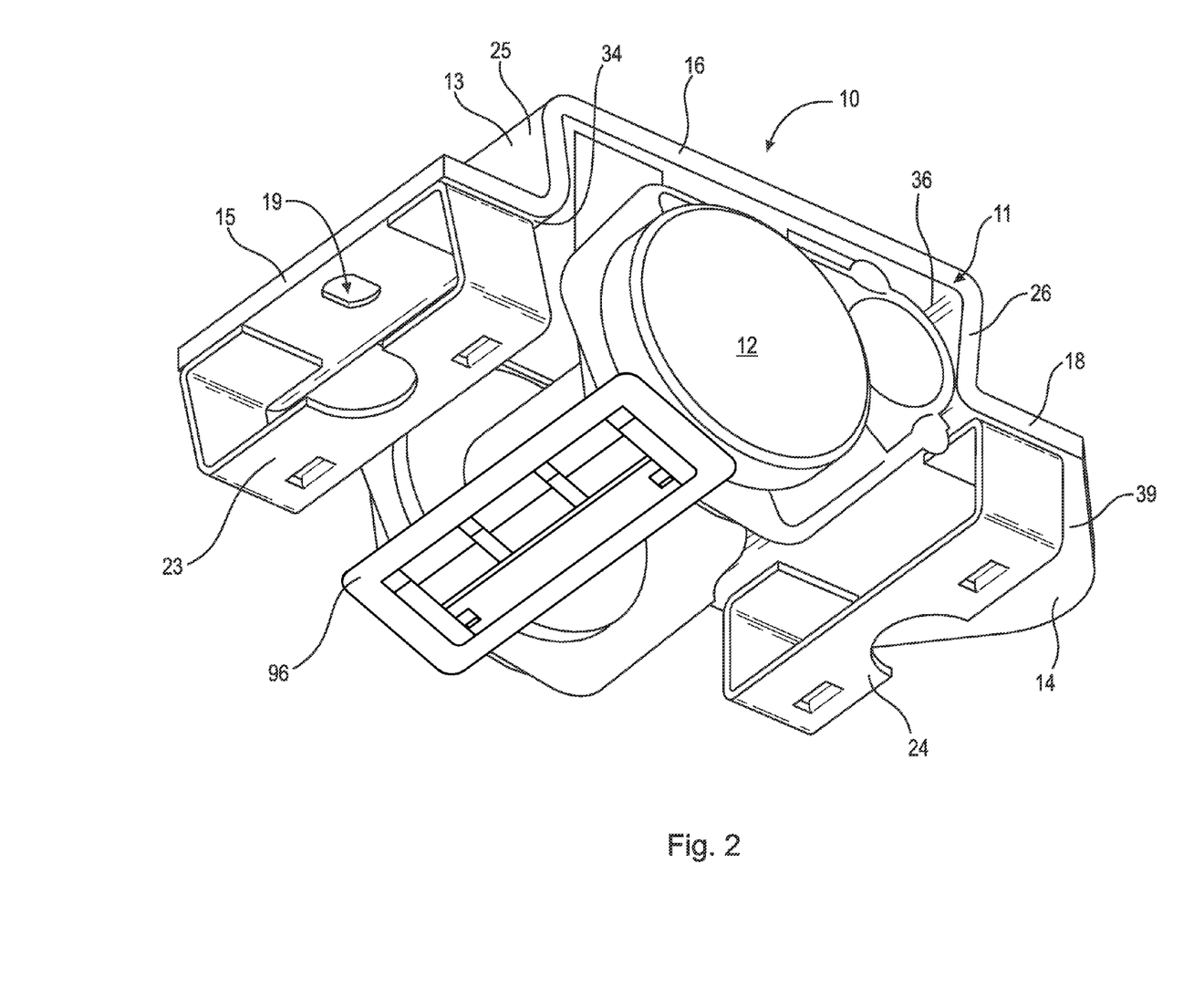
FIG. 2 is a front bottom perspective view of a first embodiment of the housing of FIG. 1, shown with a retractor.

FIG. 2 is a front bottom perspective view of a first embodiment of housing 10 of FIG. 1, shown with retractor 12 secured to frame 11.

Figure 3:
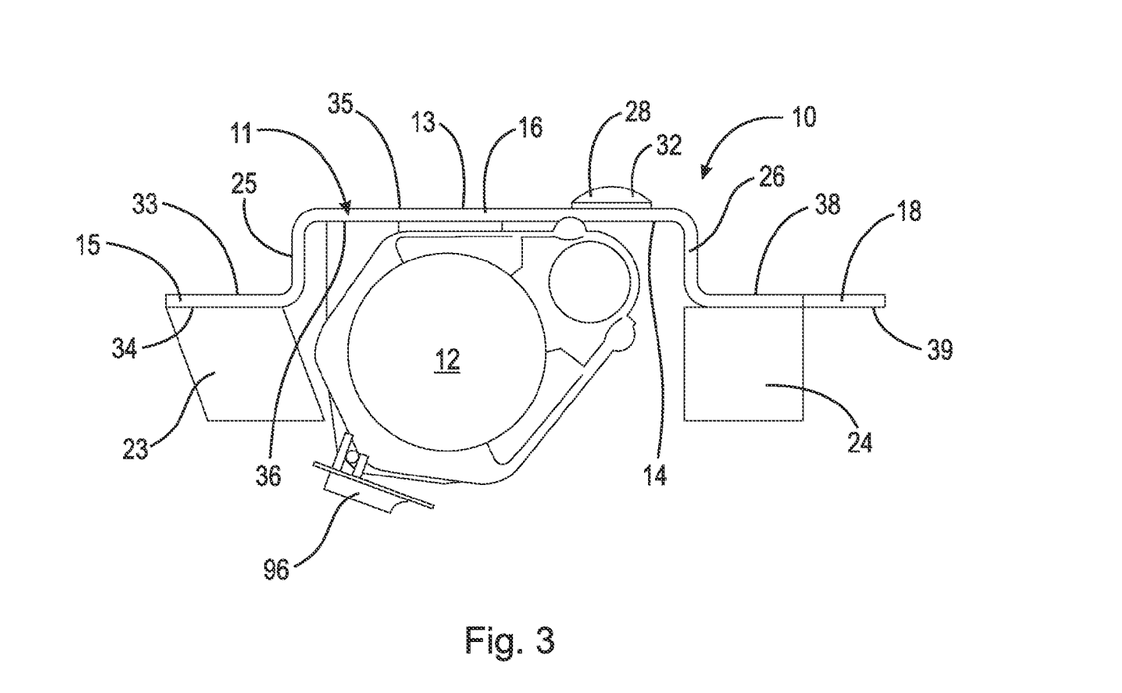
FIG. 3 is a right side elevational view of the housing of FIG. 2.
Figure 4:
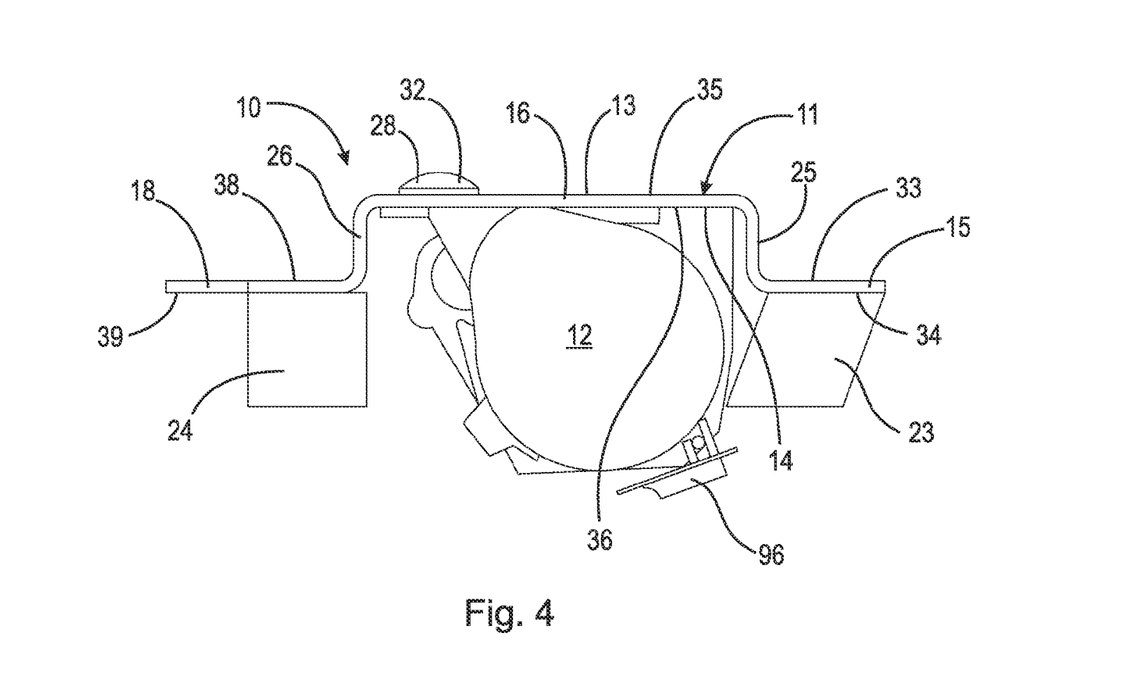
FIG. 4 is a left side elevational view of the housing of FIG. 2.

FIG. 3 is a right side elevational view of housing 10 and FIG. 4 is a corresponding left side elevational view of housing 10.

Figure 5:
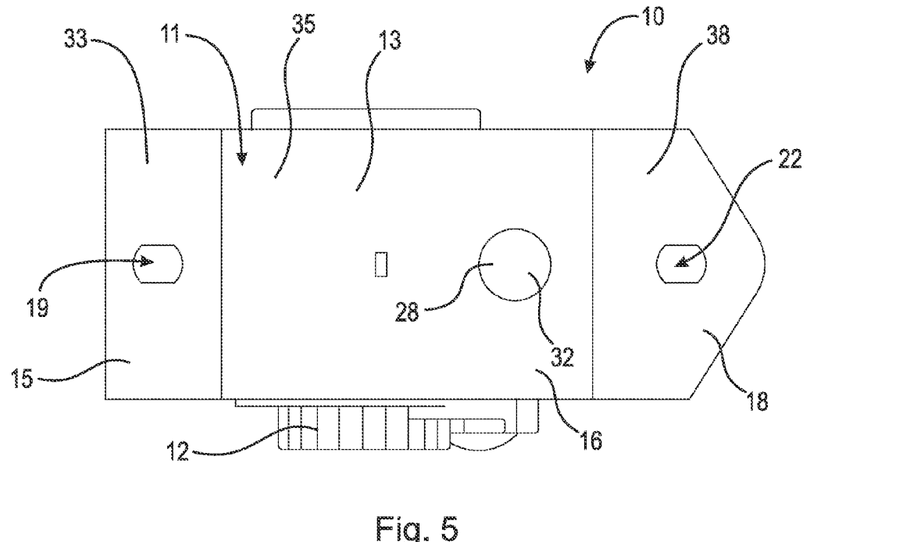
FIG. 5 is a top plan view of the housing of FIG. 2.
Figure 6:
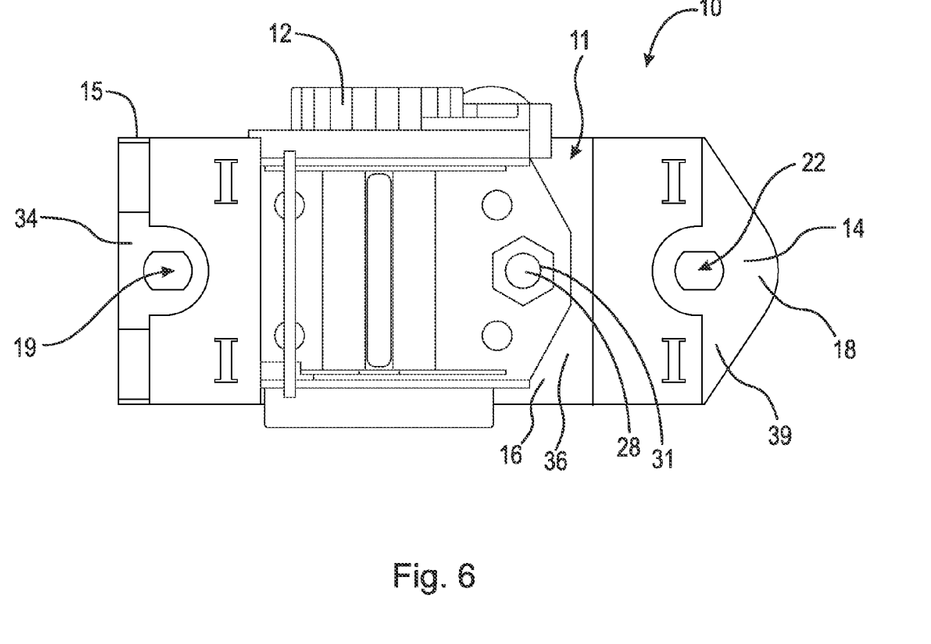
FIG. 6 is a bottom plan view of the housing of FIG. 2.

FIG. 5 is a top plan view of housing 10 and FIG. 6 is a corresponding bottom plan view of housing 10.

Figure 7:
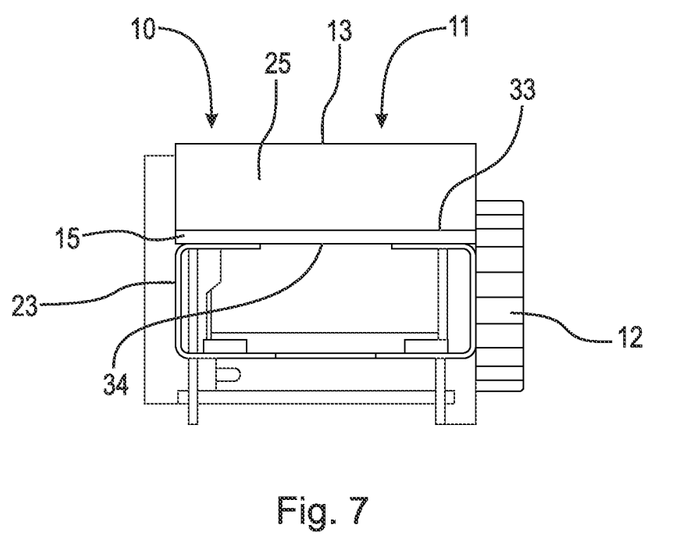
FIG. 7 is a front elevational view of the housing of FIG. 2.
Figure 8:
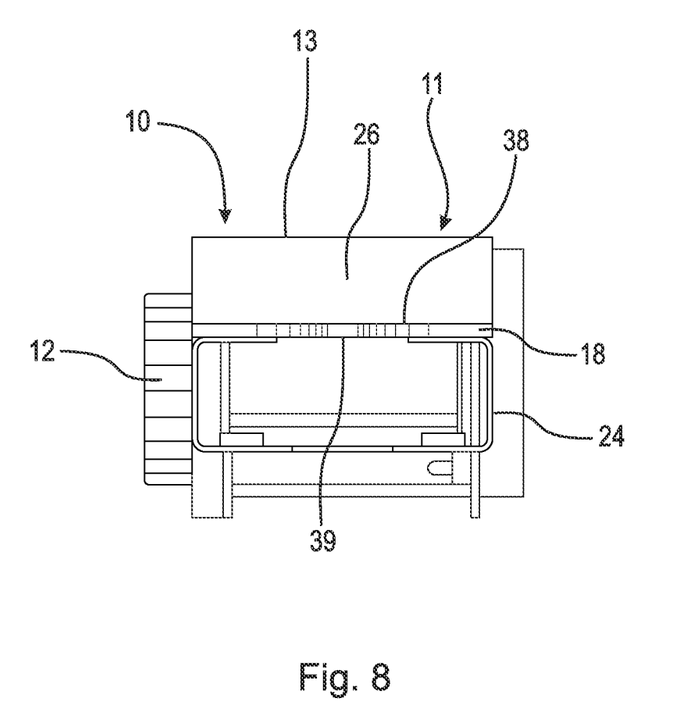
FIG. 8 is a rear elevational view of the housing of FIG. 2.

FIG. 7 is a front elevational view of housing 10 and FIG. 8 is a corresponding rear elevational view of housing 10.

Figure 9:
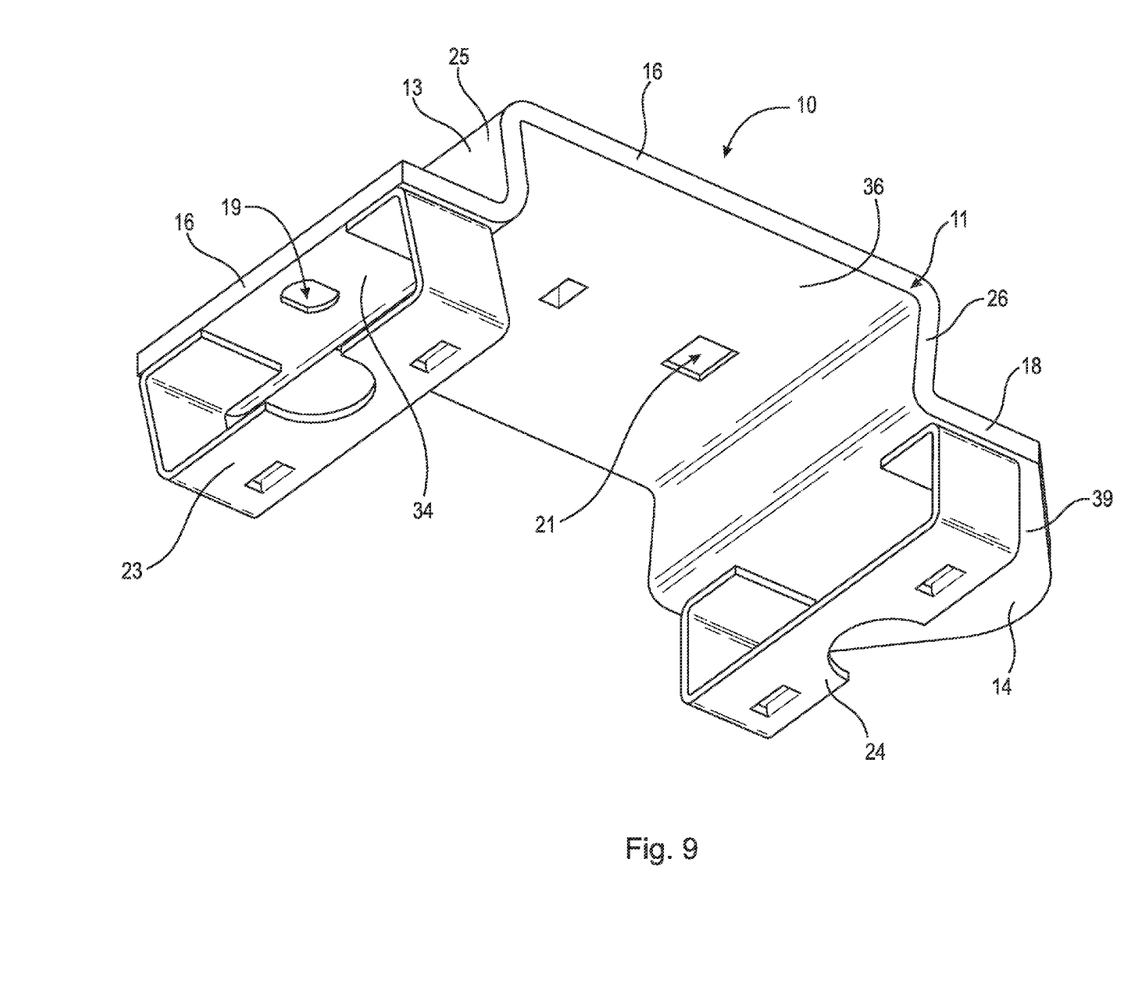
FIG. 9 is a front bottom perspective view of the housing of FIG. 2, shown with the retractor removed.

FIG. 9 is a front bottom perspective view of housing 10, shown with retractor 12 removed.

Figure 10:
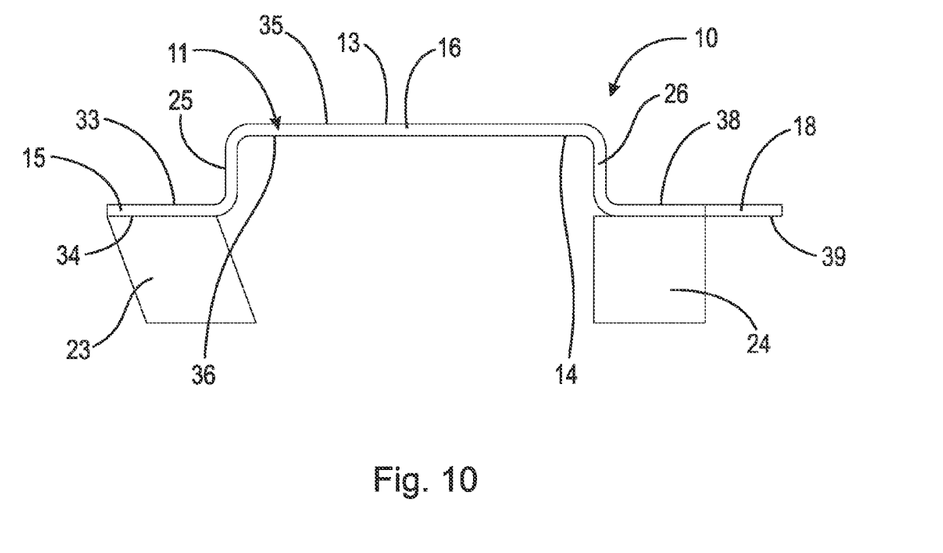
FIG. 10 is a right side elevational view of the housing of FIG. 9.
Figure 11:
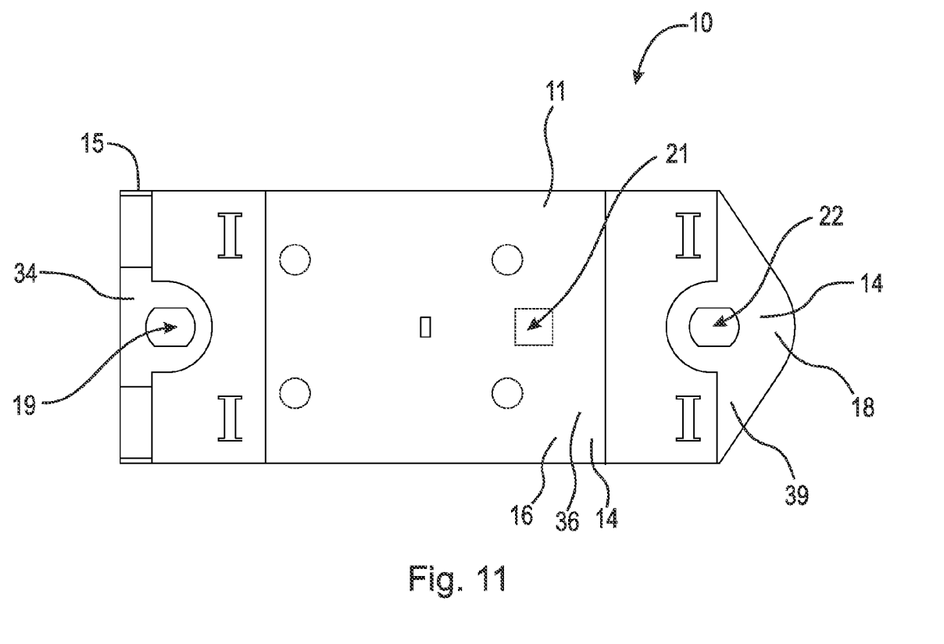
FIG. 11 is a bottom plan view of the housing of FIG. 9.

FIG. 10 is a right side elevational view of housing 10 of FIG. 9 and FIG. 11 is a bottom plan view of housing 10 of FIG. 9.

As shown in FIGS. 1 through 11, in the first embodiment, the present invention housing 10 broadly includes frame 11, retractor 12, and at least one mounting bracket 23, 24. Frame 11 has top surface 13 and bottom surface 14. Retractor 12 is secured to the bottom surface of frame 11 and operatively arranged to hold and store seat belt 91. Preferably, the at least one mounting bracket, includes first mounting bracket 23 and second mounting bracket 24, which are arranged to be secured to body 94 of the vehicle 90.

In the first embodiment, frame 11 further includes first portion 15, first transition 25, second portion 16, second transition 26, and third portion 18. First portion 15 and second portion 16 are secured to one another via first transition 25, such that first portion 15 and second portion 16 are disposed at opposite ends of and integral with first transition 25. In particular, frame 11 at first portion 15 extends longitudinally and curves upwardly at first transition 25, such that first portion 15 and first transition 25 are substantially perpendicular to one another. Frame 11 then continues upwardly and curves outwardly, extending longitudinally at second portion 16, such that second portion 16 and first transition 25 are substantially perpendicular to one another. Similarly, second portion 16 and third portion 18 are secured to one another via second transition 26, such that second portion 16 and third portion 18 are disposed at opposite ends of and integral with second transition 26. In particular, frame 11 at second portion 16 extends longitudinally and curves downwardly at second transition 26, such that second portion 16 and second transition 26 are substantially perpendicular to one another. Frame 11 then continues downwardly and curves outwardly, extending longitudinally at third portion 18, such that third portion 18 and second transition 26 are substantially perpendicular to one another.

In the first embodiment, first portion 15 includes first top surface 33 and first bottom surface 34, second portion 16 includes second top surface 35 and second bottom surface 36, and third portion 18 includes third top surface 38 and third bottom surface 39. First mounting bracket 23 is secured to first bottom surface 34 of first portion 15 and second mounting bracket 24 is secured to third bottom surface 39 of third portion 18.

Frame 11 includes at least one aperture, but preferably three apertures. First aperture 19 is disposed within first portion 15, second aperture 21 is disposed within second portion 16, and third aperture 22 is disposed within third portion 18. Various fastening means, such as bolts, screws, etc. may be used to secure the first and second mounting brackets to the body of the vehicle via the first and third apertures. Additionally, retractor 12 is secured to second bottom surface 36 of second portion 16 of frame 11 via a fastening means, such as bolt 28 disposed within second aperture 21 and secured to frame 11 via nut 31. Bolt 28 includes head 32, which rests upon second top surface 35 and prevents bolt 28 from sliding completely through second aperture 21. Furthermore, retractor 12 includes guide 96 having a slot through which seatbelt 91 is threaded.

In the first embodiment, the frame has a length and a width, and the length is approximately 7 inches and the width is approximately 2¾ inches. However, it should be appreciated that the dimensions may vary and that the passenger restraint housing may be any size suitable in the art. Preferably, the frame is made of metal. However, it should be appreciated that the frame, as well as any of the other elements, such as the retractor, seat belt, etc., can be made of any suitable material known in the art.

Figure 12:
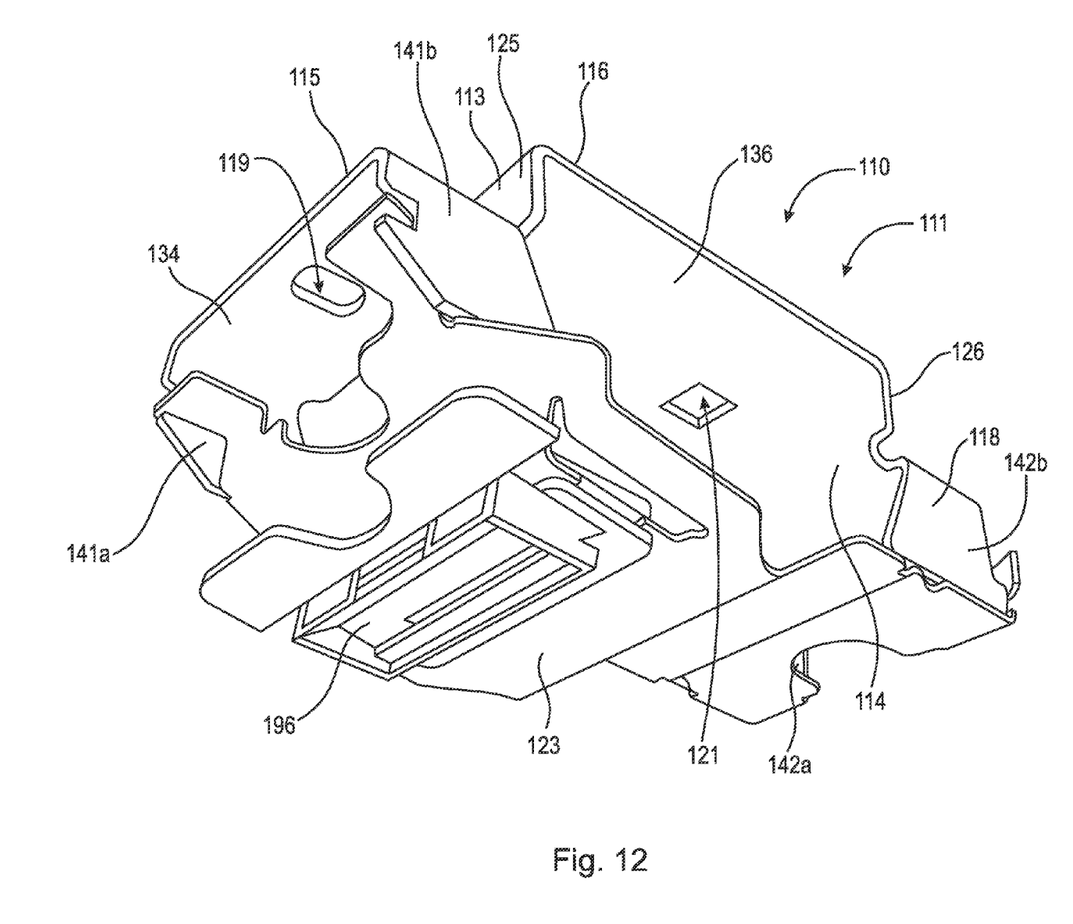
FIG. 12 is a front bottom perspective view of a second embodiment of the passenger restraint housing.

FIG. 12 is a front bottom perspective view of a second embodiment of housing 110.

Figure 13:
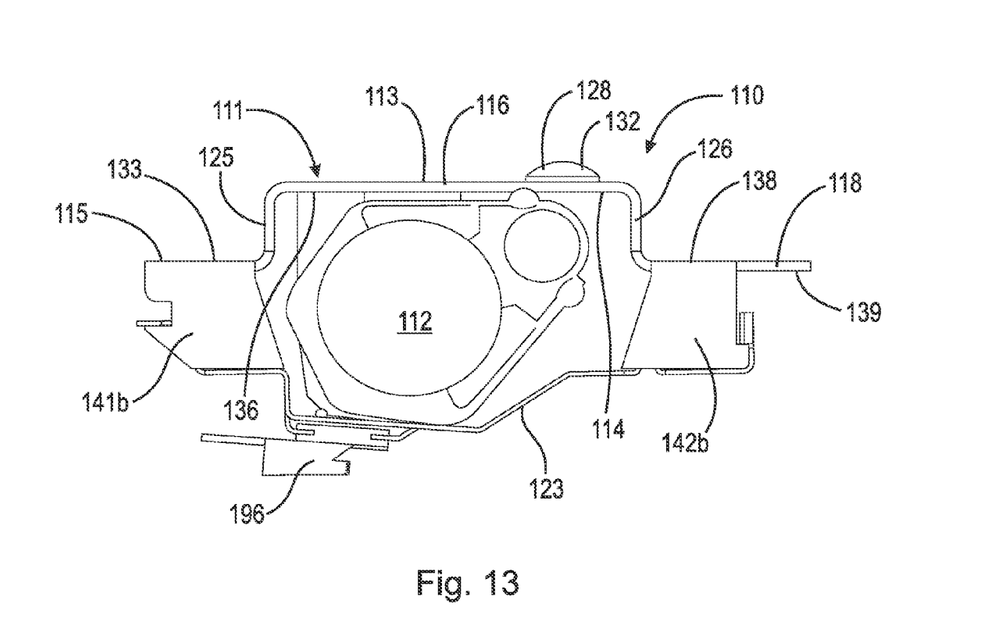
FIG. 13 is a right side elevational view of the housing of FIG. 12, shown with the retractor.
Figure 14:
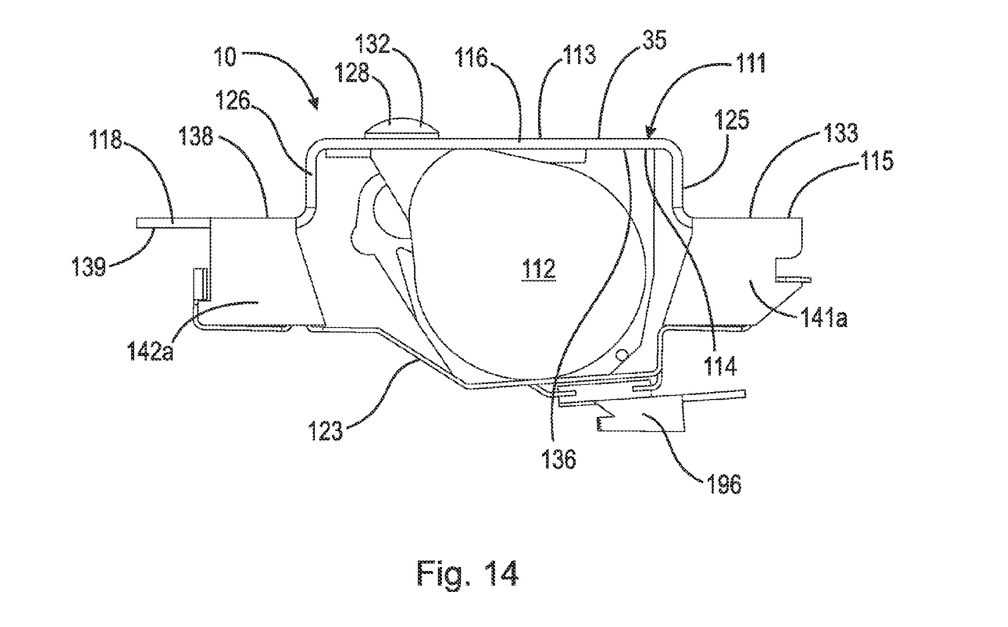
FIG. 14 is a left side elevational view of the housing of FIG. 13.

FIG. 13 is a right side elevational view of housing 110 and FIG. 14 is a corresponding left side elevational view of housing 110, shown with retractor 112 secured to frame 111.

Figure 15:
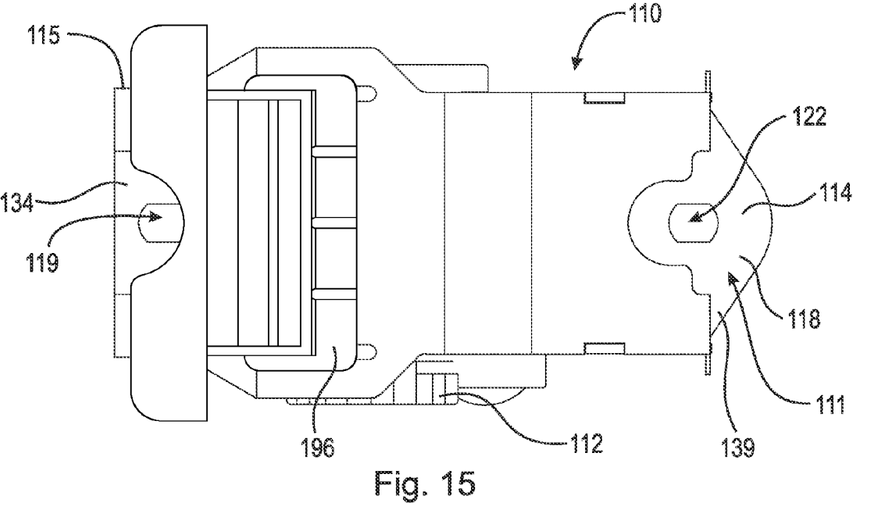
FIG. 15 is a bottom plan view of the housing of FIG. 13.
Figure 16:
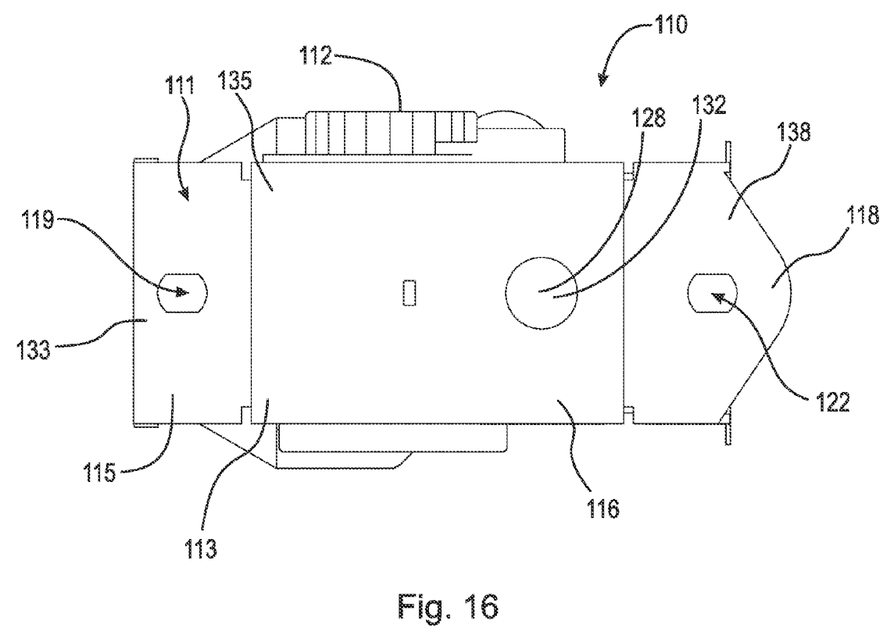
FIG. 16 is a top plan view of the housing of FIG. 13.

FIG. 15 is a bottom plan view of housing 110 and FIG. 16 is a corresponding top plan view of housing 110.

Figure 17:
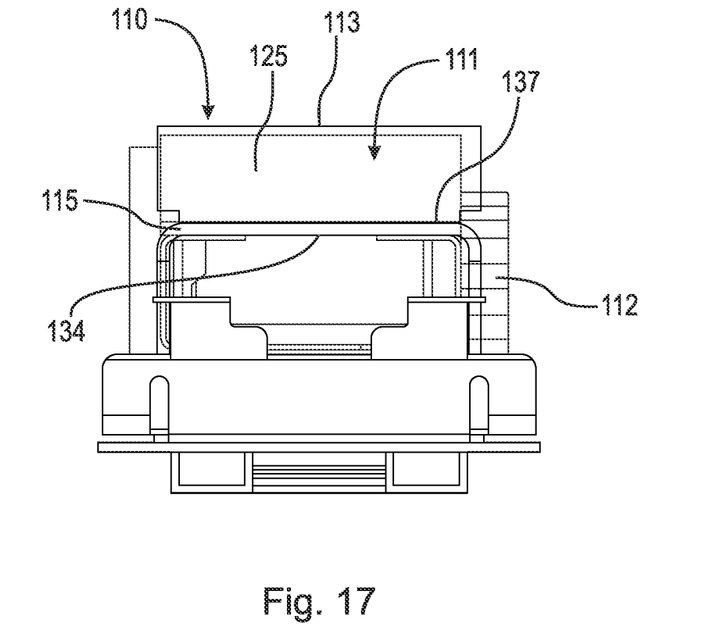
FIG. 17 is a front elevational view of the housing of FIG. 13.
Figure 18:
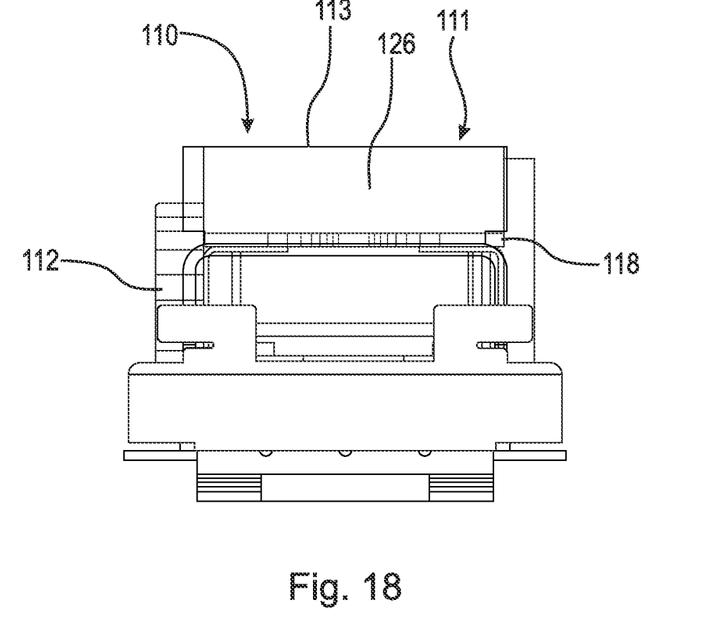
FIG. 18 is a rear elevational view of the housing of FIG. 13.

FIG. 17 is a front elevational view of housing 110 and FIG. 18 is a corresponding rear elevational view of housing 110.

As shown in FIGS. 12 through 18, in the second embodiment, the present invention housing 110 broadly includes frame 111, retractor 112, and mounting bracket 123. Frame 111 has top surface 113 and bottom surface 114. Retractor 112 is secured to the bottom surface of frame 111 and operatively arranged to hold and store seat belt 91. Preferably, mounting bracket 123, which is arranged to be secured to body 94 of the vehicle 90.

In the second embodiment, frame 111 further includes first portion 115, first transition 125, second portion 116, second transition 126, and third portion 118. First portion 115 and second portion 116 are secured to one another via first transition 125, such that first portion 115 and second portion 116 are disposed at opposite ends of and integral with first transition 125. In particular, frame 111 at first portion 115 extends longitudinally and curves upwardly at first transition 125, such that first portion 115 and first transition 125 are substantially perpendicular to one another. Frame 111 then continues upwardly and curves outwardly, extending longitudinally at second portion 116, such that second portion 116 and first transition 125 are substantially perpendicular to one another. Similarly, second portion 116 and third portion 118 are secured to one another via second transition 126, such that second portion 116 and third portion 118 are disposed at opposite ends of and integral with second transition 126. In particular, frame 111 at second portion 116 extends longitudinally and curves downwardly at second transition 126, such that second portion 116 and second transition 126 are substantially perpendicular to one another. Frame 111 then continues downwardly and curves outwardly, extending longitudinally at third portion 118, such that third portion 118 and second transition 126 are substantially perpendicular to one another.

In the second embodiment, first portion 115 includes first top surface 133 and first bottom surface 134, second portion 116 includes second top surface 135 and second bottom surface 136, and third portion 118 includes third top surface 138 and third bottom surface 139. However, unlike in the first embodiment, first portion 115 includes first flanges 141a, 141b, which extend downwardly from and substantially perpendicular to first portion 115. Similarly, third portion 118 includes second flanges 142a, 142b, which extend downwardly from and substantially perpendicular to third portion 118. Mounting bracket 123 extends longitudinally and substantially parallel to frame 111 and is secured to frame 111 via first flanges 141a, 141b of first portion 115 and second flanges 142a, 142b of third portion 118.

Frame 111 includes at least one aperture, but preferably three apertures. First aperture 119 is disposed within first portion 115, second aperture 121 is disposed within second portion 116, and third aperture 122 is disposed within third portion 118. Various fastening means, such as bolts, screws, etc. may be used to secure the first and second mounting brackets to the body of the vehicle via the first and third apertures. Additionally, retractor 112 is secured to second bottom surface 136 of second portion 116 of frame 111 via a fastening means, such as bolt 128 disposed within second aperture 121 and secured to frame 111 via nut 131. Bolt 128 includes head 132, which rests upon second top surface 135 and prevents bolt 128 from sliding completely through second aperture 121. Furthermore, retractor 112 includes guide 196 having a slot through which seatbelt 91 is threaded.

Preferably, in the second embodiment, the frame is made of metal. However, it should be appreciated that the frame, as well as any of the other elements, such as the retractor, seat belt, etc., can be made of any suitable material known in the art. It should also be appreciated that, any of the fastening means of the passenger restraint housing can be any suitable fastening means known in the art, such as but not limited to, screws, bolts, welds, etc.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A passenger restraint housing for a vehicle comprising:
a frame having a top surface, a bottom surface, a first portion, a first transition, a second portion, a second transition, and a third portion, wherein the first and second portions are secured to one another via the first transition and the second and third portions are secured to one another via the second transition;
a retractor secured to the bottom surface of the frame and operatively arranged to hold a seat belt;
at least two mounting brackets, wherein the at least two mounting brackets are arranged to be secured to the body of the vehicle and the first mounting bracket is secured to the first portion and the second mounting bracket is secured to the third portion.

2. The passenger restraint housing of claim 1, wherein the first and second portions are disposed at opposite ends of and integral with the first transition and the second and third portions are disposed at opposite ends of and integral with the second transition.

3. The passenger restraint housing of claim 2, wherein the first, second, and third portions are arranged substantially parallel to one another and substantially perpendicular to the first and second transitions.

4. The passenger restraint housing of claim 1, the frame further comprising at least one aperture.

5. The passenger restraint housing of claim 4, including three apertures, the first aperture is disposed within the first portion, the second aperture is disposed within the second portion, and the third aperture is disposed within the third portion.

6. The passenger restraint housing of claim 5, wherein the retractor is secured to the bottom surface of the frame via a fastening means disposed within the second aperture.

7. The passenger restraint housing of claim 1, wherein the frame has a length and a width, and the length is approximately 7 inches and the width is approximately 2¾ inches.

8. The passenger restraint housing of claim 1, wherein the frame is made of metal.

9. The passenger restraint housing of claim 1, the retractor further comprising a guide having a slot, wherein the seatbelt is threaded through the slot of the guide.

10. A passenger restraint housing for a vehicle comprising:
a frame having a top surface, a bottom surface, a first portion, a first transition, a second portion, a second transition, and a third portion, wherein the first and second portions are secured to one another via the first transition and the second and third portions are secured to one another via the second transition;

a retractor secured to the bottom surface of the frame and operatively arranged to hold a seat belt;

a mounting bracket, wherein the mounting bracket is arranged to be secured to the body of the vehicle and the mounting bracket is secured to the first portion and the third portion of the frame.

11. The passenger restraint housing of claim 10, wherein the first and second portions are disposed at opposite ends of and integral with the first transition and the second and third portions are disposed at opposite ends of and integral with the second transition.

12. The passenger restraint housing of claim 11, wherein the first, second, and third portions are arranged substantially parallel to one another and substantially perpendicular to the first and second transitions.

13. The passenger restraint housing of claim 10, the frame further comprising at least one aperture.

14. The passenger restraint housing of claim 13, including three apertures, the first aperture is disposed within the first portion, the second aperture is disposed within the second portion, and the third aperture is disposed within the third portion.

15. The passenger restraint housing of claim 10, wherein the frame is made of metal.

16. The passenger restraint housing of claim 10, the retractor further comprising a guide having a slot, wherein the seatbelt is threaded through the slot of the guide.

17. A passenger restraint housing for a vehicle comprising:

a frame having a top surface, a bottom surface, a first portion, a first transition, a second portion, a second transition, and a third portion, wherein the first and second portions are secured to one another via the first transition and the second and third portions are secured to one another via the second transition, the first and second portions are disposed at opposite ends of and integral with the first transition and the second and third portions are disposed at opposite ends of and integral with the second transition, and the first, second, and third portions are arranged substantially parallel to one another and substantially perpendicular to the first and second transitions;

a retractor secured to the bottom surface of the frame and operatively arranged to hold a seat belt;

at least one mounting bracket, wherein the at least one mounting bracket is arranged to be secured to the body of the vehicle.

18. The passenger restraint housing of claim 17, including two mounting brackets, wherein the first mounting bracket is secured to the first portion and the second mounting bracket is secured to the third portion.

19. The passenger restraint housing of claim 17, the frame further comprising at least one aperture.

20. The passenger restraint housing of claim 19, including three apertures, the first aperture is disposed within the first portion, the second aperture is disposed within the second portion, and the third aperture is disposed within the third portion.

* * * * *